(12) United States Patent
Bakke et al.

(10) Patent No.: US 7,353,259 B1
(45) Date of Patent: *Apr. 1, 2008

(54) METHOD AND APPARATUS FOR EXCHANGING CONFIGURATION INFORMATION BETWEEN NODES OPERATING IN A MASTER-SLAVE CONFIGURATION

(75) Inventors: Mark A. Bakke, Maple Grove, MN (US); James D. Muchow, Zimmerman, MN (US); Craig A. Johnson, Maple Grove, MN (US); Donald W. Teske, Eden Prairie, MN (US)

(73) Assignee: Cisco Technology, Inc., San Jose, CA (US)

(*) Notice: Subject to any disclaimer, the term of this patent is extended or adjusted under 35 U.S.C. 154(b) by 480 days.

This patent is subject to a terminal disclaimer.

(21) Appl. No.: 10/128,657

(22) Filed: Apr. 22, 2002

Related U.S. Application Data

(63) Continuation-in-part of application No. 10/094,552, filed on Mar. 7, 2002.

(51) Int. Cl.
*G06F 15/16* (2006.01)
*G06F 11/00* (2006.01)
*G06F 15/173* (2006.01)

(52) U.S. Cl. .................... 709/208; 714/4; 714/11; 714/12; 714/13; 709/223

(58) Field of Classification Search ........... 709/208, 709/209, 223, 224; 714/4, 11–13
See application file for complete search history.

(56) References Cited

U.S. PATENT DOCUMENTS

| | | | |
|---|---|---|---|
| 4,495,617 A | 1/1985 | Ampulski et al. | |
| 5,390,326 A | 2/1995 | Shah | |
| 5,461,608 A | 10/1995 | Yoshiyama | |
| 5,473,599 A | 12/1995 | Li et al. | |
| 5,491,812 A | 2/1996 | Pisello et al. | |
| 5,535,395 A | 7/1996 | Tipley et al. | |
| 5,544,077 A | 8/1996 | Hershey | |

(Continued)

OTHER PUBLICATIONS

Knight, S., et al., "Virtual Router Redundancy Protocol", http://www.search.ietf.org/rfc/rfc2338.txt, VRRP, RFC 2338,(1998), pp. 1-26.

(Continued)

*Primary Examiner*—William Vaughn
*Assistant Examiner*—Peling A Shaw
(74) *Attorney, Agent, or Firm*—Schwegman, Lundberg & Woessne P.A.

(57) ABSTRACT

A node, within a networked computer system, is capable of supporting communications with other nodes relating to operating multiple application instances in a master-slave configuration. Each node periodically generates and sends a Heartbeat message that indicates the operational status and configuration information for one or more application instances being managed by the node. When a node receives a Heartbeat message from a remote node, it determines whether new configuration information should be obtained for each of the application instances the node is managing, and establishes a connection with a remote node that can access the new configuration information. The connection is an HTTP connection, in one embodiment. The node then requests and receives that new configuration information from the remote node. In one embodiment, the new configuration information is received in an XML format.

23 Claims, 9 Drawing Sheets

U.S. PATENT DOCUMENTS

| | | | |
|---|---|---|---|
| 5,600,828 A | 2/1997 | Johnson et al. | |
| 5,642,337 A | 6/1997 | Oskay et al. | |
| 5,666,486 A | 9/1997 | Alfieri et al. | |
| 5,732,206 A | 3/1998 | Mendel | |
| 5,812,821 A | 9/1998 | Sugi et al. | |
| 5,832,299 A | 11/1998 | Wooten | |
| 5,850,573 A | 12/1998 | Wada | |
| 5,870,571 A | 2/1999 | Duburcq et al. | |
| 5,909,544 A | 6/1999 | Anderson et al. | |
| 5,941,972 A | 8/1999 | Hoese et al. | |
| 5,951,683 A | 9/1999 | Yuuki et al. | |
| 5,991,813 A | 11/1999 | Zarrow | |
| 5,996,024 A | 11/1999 | Blumenau | |
| 5,996,027 A | 11/1999 | Volk et al. | |
| 6,006,259 A | 12/1999 | Adelman et al. | |
| 6,009,476 A | 12/1999 | Flory et al. | |
| 6,009,480 A | 12/1999 | Pleso | |
| 6,018,765 A | 1/2000 | Durana et al. | |
| 6,041,381 A | 3/2000 | Hoese | |
| 6,078,957 A | 6/2000 | Adelman et al. | |
| 6,108,300 A | 8/2000 | Coile et al. | |
| 6,108,699 A | 8/2000 | Moiin | |
| 6,131,119 A | 10/2000 | Fukui | |
| 6,134,673 A * | 10/2000 | Chrabaszcz | 714/13 |
| 6,145,019 A | 11/2000 | Firooz et al. | |
| 6,163,855 A * | 12/2000 | Shrivastava et al. | 714/4 |
| 6,178,445 B1 | 1/2001 | Dawkins et al. | |
| 6,185,620 B1 | 2/2001 | Weber et al. | |
| 6,195,687 B1 | 2/2001 | Greaves et al. | |
| 6,195,760 B1 * | 2/2001 | Chung et al. | 714/4 |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 * | 11/2001 | Arendt et al. | 714/4 |
| 6,327,622 B1 | 12/2001 | Jindal et al. | |
| 6,343,320 B1 | 1/2002 | Fairchild et al. | |
| 6,353,612 B1 | 3/2002 | Zhu et al. | |
| 6,363,416 B1 | 3/2002 | Naeimi et al. | |
| 6,378,025 B1 | 4/2002 | Getty | |
| 6,392,990 B1 | 5/2002 | Tosey et al. | |
| 6,393,583 B1 * | 5/2002 | Meth et al. | 714/12 |
| 6,400,730 B1 | 6/2002 | Latif et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,591,310 B1 | 7/2003 | Johnson | |
| 6,597,956 B1 | 7/2003 | Aziz et al. | |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,678,721 B1 | 1/2004 | Bell | |
| 6,683,883 B1 | 1/2004 | Czeiger et al. | |
| 6,684,209 B1 | 1/2004 | Ito et al. | |
| 6,691,244 B1 | 2/2004 | Kampe et al. | |
| 6,697,875 B1 | 2/2004 | Wilson | |
| 6,697,924 B2 | 2/2004 | Swank | |
| 6,718,361 B1 | 4/2004 | Basani et al. | |
| 6,721,907 B2 | 4/2004 | Earl | |
| 6,724,757 B1 | 4/2004 | Zadikian et al. | |
| 6,738,854 B2 | 5/2004 | Hoese et al. | |
| 6,748,550 B2 * | 6/2004 | McBrearty et al. | 714/4 |
| 6,757,291 B1 | 6/2004 | Hu | |
| 6,760,783 B1 | 7/2004 | Berry | |
| 6,763,195 B1 | 7/2004 | Willebrand et al. | |
| 6,763,419 B2 | 7/2004 | Hoese et al. | |
| 6,766,520 B1 | 7/2004 | Rieschl et al. | |
| 6,771,663 B1 | 8/2004 | Jha | |
| 6,771,673 B1 | 8/2004 | Baum et al. | |
| 6,799,316 B1 | 9/2004 | Aguilar et al. | |
| 6,807,581 B1 | 10/2004 | Starr et al. | |
| 6,823,418 B2 | 11/2004 | Langendorf et al. | |
| 6,839,752 B1 | 1/2005 | Miller et al. | |
| 6,845,403 B2 | 1/2005 | Chadalapaka | |
| 6,848,007 B1 | 1/2005 | Reynolds et al. | |
| 6,856,591 B1 | 2/2005 | Ma et al. | |
| 6,859,462 B1 | 2/2005 | Mahoney et al. | |
| 6,877,042 B2 | 4/2005 | Tawil et al. | |
| 6,877,044 B2 | 4/2005 | Lo et al. | |
| 6,885,633 B1 | 4/2005 | Mikkonen | |
| 6,886,171 B2 | 4/2005 | MacLeod | |
| 6,889,338 B2 | 5/2005 | Srinivasan et al. | |
| 6,895,461 B1 | 5/2005 | Thompson | |
| 6,920,491 B2 | 7/2005 | Kim | |
| 6,922,743 B2 | 7/2005 | Mizuno | |
| 6,934,799 B2 | 8/2005 | Acharya et al. | |
| 6,938,092 B2 | 8/2005 | Burns | |
| 6,944,785 B2 | 9/2005 | Gadir et al. | |
| 6,965,934 B1 | 11/2005 | Reynolds et al. | |
| 7,043,727 B2 | 5/2006 | Bennett et al. | |
| 7,165,258 B1 | 1/2007 | Kuik et al. | |
| 7,281,062 B1 | 10/2007 | Kuik et al. | |
| 2002/0010750 A1 | 1/2002 | Baretzki | |
| 2002/0042693 A1 | 4/2002 | Kampe et al. | |
| 2002/0049845 A1 | 4/2002 | Sreenivasan et al. | |
| 2002/0055978 A1 | 5/2002 | Joon-Bo et al. | |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0178143 A1 | 11/2002 | Fujimoto | |
| 2002/0188657 A1 * | 12/2002 | Traversat et al. | 709/201 |
| 2002/0188711 A1 | 12/2002 | Meyer et al. | |
| 2003/0005068 A1 | 1/2003 | Nickel et al. | |
| 2003/0014462 A1 | 1/2003 | Bennett et al. | |
| 2003/0018813 A1 | 1/2003 | Antes et al. | |
| 2003/0018927 A1 | 1/2003 | Gadir et al. | |
| 2003/0037284 A1 | 2/2003 | Srinivasan et al. | |
| 2003/0115447 A1 | 6/2003 | Pham et al. | |
| 2003/0140193 A1 | 7/2003 | Acharya et al. | |
| 2003/0149830 A1 | 8/2003 | Torr et al. | |
| 2003/0182455 A1 | 9/2003 | Hetzler et al. | |
| 2003/0208579 A1 | 11/2003 | Brady et al. | |
| 2003/0210686 A1 | 11/2003 | Terrell et al. | |
| 2004/0024778 A1 | 2/2004 | Cheo | |
| 2004/0064553 A1 * | 4/2004 | Kjellberg | 709/224 |
| 2004/0141468 A1 | 7/2004 | Christensen | |
| 2004/0233910 A1 | 11/2004 | Chen et al. | |
| 2005/0055418 A1 * | 3/2005 | Blanc et al. | 709/209 |
| 2005/0063313 A1 | 3/2005 | Nanavati et al. | |
| 2005/0268151 A1 | 12/2005 | Hunt et al. | |
| 2006/0265529 A1 | 11/2006 | Kuik et al. | |

OTHER PUBLICATIONS

Li, T., et al., "Cisco Hot Standby Router Protocol (HSRP)", http://www.search.ietf.org/rfc/rfc2281.txt, Cisco HSRP, RFC 2281,(1998),pp. 1-16.

Moore, K., "On the use of HTTP as a Substrate", http://www.search.ietf.org/rfc/rfc3205.txt, HTTP Layering, RFC 3205,(2002),pp. 1-14.

Gusella, R., et al .,"An Election Algorithm for a Distributed Clock Synchronization Program", *CS Technical Report #275*, University of California, Berkeley,(Dec. 1985),pp. 1-14.

Gusella, R., et al .,"The Berkeley UNIX Time Synchronization Protocol", *UNIX Programmers Manual*, 4.3 Berkeley Software Distrib., vol. 2C, (1986),10 pages.

Lewis, P..,"A High-Availability Cluster for Linux", http://www2.linuxjournal.com/lj-issues/issue64/3247.html,(Apr. 1994),11 pages.

Meth, K. Z., et al., "Design of the iSCSI protocol", *Proceedings of the 20th IEEE Conference on Mass Storage Systems and Technologies*, (Apr. 7-10, 2003),116-122.

Satran, J., et al., *iSCSI*, IPS Internet Draft, draft-ietf-ips-iSCSI-12.txt, Category: standards—track,(Apr. 17, 2002),260 p.

Simitci, H., et al., "Evaluation of SCSP over TCP/IP and SCSI over fibre channel connections", *Hot Interconnects*, 9, (Aug. 2001),87-91.

*VMware ESX Server: User's Manual*, Version 1.0, obtained from http://web.archive.org/web/20010608201203/www.vmware.com/support,(Jun. 6, 2001),122-124.

Bakker, G., *IP Aliasing*, obtained from http://www.zone-h.org/files/24/ip_aliasing.txt,(1999),3 p.

US 7,231,429, 06/2007, Muchow (withdrawn)

* cited by examiner

| APPLICATION TYPE /402 | APPLICATION ID /404 | CURRENT STATE /406 | NEW CONFIG. FLAG /414 | CONFIG. ID /416 |
|---|---|---|---|---|
| 433 | 1037 | MASTER | 0 | 24 |
| 433 | 1234 | SLAVE | 1 | 6 |
| 433 | 4578 | CANDIDATE | 0 | 17 |
| 856 | 3296 | MASTER | 0 | 2 |
| 763 | 1037 | RESIGNATION | 0 | 3 |
| 763 | 9876 | MASTER | 0 | 14 |
| -- | -- | NULL | 0 | -- |

METHOD AND APPARATUS FOR EXCHANGING CONFIGURATION INFORMATION BETWEEN NODES OPERATING IN A MASTER-SLAVE CONFIGURATION

RELATED APPLICATION

This is a continuation-in-part of application Ser. No. 10/094,552, filed Mar. 7, 2002, entitled "Method and Apparatus for Exchanging Heartbeat Messages and Configuration Information Between Nodes Operating in a Master-Slave Configuration."

TECHNICAL FIELD OF THE INVENTION

The present invention relates generally to methods for managing execution of multiple applications within a networked, multi-processor system, and more specifically, methods for exchanging configuration information between multiple, networked nodes, which execute applications using a master-slave configuration.

BACKGROUND OF THE INVENTION

In some computer systems, it is important to maximize the availability of critical services and applications. Generally, this is achieved by using a fault tolerant system or by using high availability ("HA") software, which is implemented on a cluster of multiple nodes. Both types of systems are described briefly in "A High-Availability Cluster for Linux," Phil Lewis (May 2, 2000).

A fault tolerant computer system includes duplicate hardware and software. For example, a fault tolerant server may have redundant power supplies, storage devices, fans, network interface cards, and so on. When one or more of these components fails, the fault is detected, and a redundant component takes over to correct the problem. In many cases, fault tolerant systems are able to provide failure recovery which is nearly seamless (i.e., imperceivable to system users). However, because these systems rely on duplicate hardware, they tend to be expensive. In addition, these systems typically are proprietary, and are tightly coupled to the operating system, whatever that system may be.

HA software also provides fault detection and correction procedures. In contrast to fault tolerant systems, HA software is implemented on two or more nodes, which are arranged in a "cluster" and communicate over a link (e.g., a network). Typically, one node operates as the "master" for a particular application, where the master is responsible for executing the application. One or more other nodes within the cluster are "slaves" for that application, where each slave is available to take over the application from a failed master, if necessary.

Generally, an HA software implementation is loosely coupled to the operating system, and therefore may be more portable to different types of systems and nodes than a fault tolerant system would be. However, one disadvantage to an HA system is that failure recovery typically takes much longer than it would with a fault tolerant system. Therefore, significant system downtimes may be perceived by system users.

One reason for the relatively slow failure recovery times is the way that failures are detected and responded to. In some systems, each slave periodically "pings" other nodes to determine whether they are reachable. If a slave determines that a master node is unreachable before expiration of a certain timeout period, the slave declares a failure and attempts to take over as master. Because this process relies on timeout periods and network communications, it provides slower recovery than is possible using fault tolerant systems. Besides being somewhat slower to recover, another disadvantage to these systems is that it is not possible to detect a failure of a single application within a master node. Instead, the entire node must fail in order for a failure to be detected.

Alternatively, a node within an HA system may periodically send out a "heartbeat" message for an application that it is executing as a master. The heartbeat message indicates that the master node continues to be able to execute the application. If a slave node does not receive a heartbeat message for a particular application within a certain timeout period, then the slave assumes that the master has failed, and an election process is initiated to determine which slave should take over as master.

The "Time Synchronization Protocol" (TSP) is an example of such an HA protocol, which is used by the clock synchronization programs timed and TEMPO. TSP is described in detail in "The Berkeley UNIX Time Synchronization Protocol," Gusella, et al. (1986). TSP supports messages for the election that occurs among slaves when, for any reason, the master disappears, as is described in detail in "An Election Algorithm for a Distributed Clock Synchronization Program," Gusella et al. (December 1985). Basically, the election process chooses a new master from among the available slaves when the original master ceases to send out heartbeat messages.

The TSP protocol functions well in the context of supporting messages and elections that occur as part of a clock synchronization program. However, its portability to other types of applications is limited, and it is not well adapted to inclusion in modern systems for several reasons.

In modern networked computer systems, each machine may be capable of simultaneously running multiple applications, each of which is executed using a master-slave configuration. In such systems, it may be necessary to exchange status information between machines for each task and/or application. The primary limitation of TSP's application to modern systems is that TSP is capable of supporting message transfer for only a single application (e.g., a time daemon) per machine. Accordingly, TSP is not adapted to exchange status information for multiple tasks or applications between machines.

In addition, when a task or application has updateable configuration information associated with it, TSP has no facility to monitor or support the transfer of new configuration information between nodes. Therefore, TSP is not an acceptable protocol for providing status and configuration messaging capabilities for modern networked computer systems.

What is needed is a protocol and method that can provide efficient failure recovery and configuration information exchanges between nodes of a networked computer system. Further needed is a protocol and method that is scalable and efficient, so that configuration messaging between nodes can be performed for potentially many tasks and applications without burdening the network (or networks) with excessive network traffic.

BRIEF DESCRIPTION OF THE DRAWING

FIG. 2 is an example of an application instance state table in accordance with one embodiment of the present invention;

DETAILED DESCRIPTION OF THE INVENTION

Various embodiments of the present invention provide methods for operating a node, within a networked computer system, which is capable of supporting communications with other nodes relating to operating multiple application instances in a master-slave configuration. The node maintains a state diagram for each application instance currently running in the master-slave configuration on the node and on the other nodes. In addition, the node listens for new application instances that are discovered on the node and on the other nodes. The nodes can be interconnected using multiple networks.

Each node occasionally sends out a "Heartbeat" message (e.g., such as that shown in FIG. 5), which indicates the status of each master and/or slave that the node is operating or maintaining. In one embodiment, each Heartbeat message can include the status information for multiple masters and/or slaves. In addition, each node determines whether each application instance's configuration information is current, and requests new configuration information for an application instance when it is not current. The method and apparatus of the various embodiments could be used in almost any high-availability system where exchange of configuration information between nodes is desired. For example, the method and apparatus of the various embodiments could be used in a system that employs Cisco System's NHAP (Nuspeed High Availability Protocol), VRRP (Virtual Router Redundancy Protocol), or HSRP (Hot Standby Router Protocol). In addition, it could be used with various cluster servers (e.g., provided by Veritas or Microsoft) or with the IBM HACMP (High-Availability Cluster Multi-Processing) System.

Figure 1:
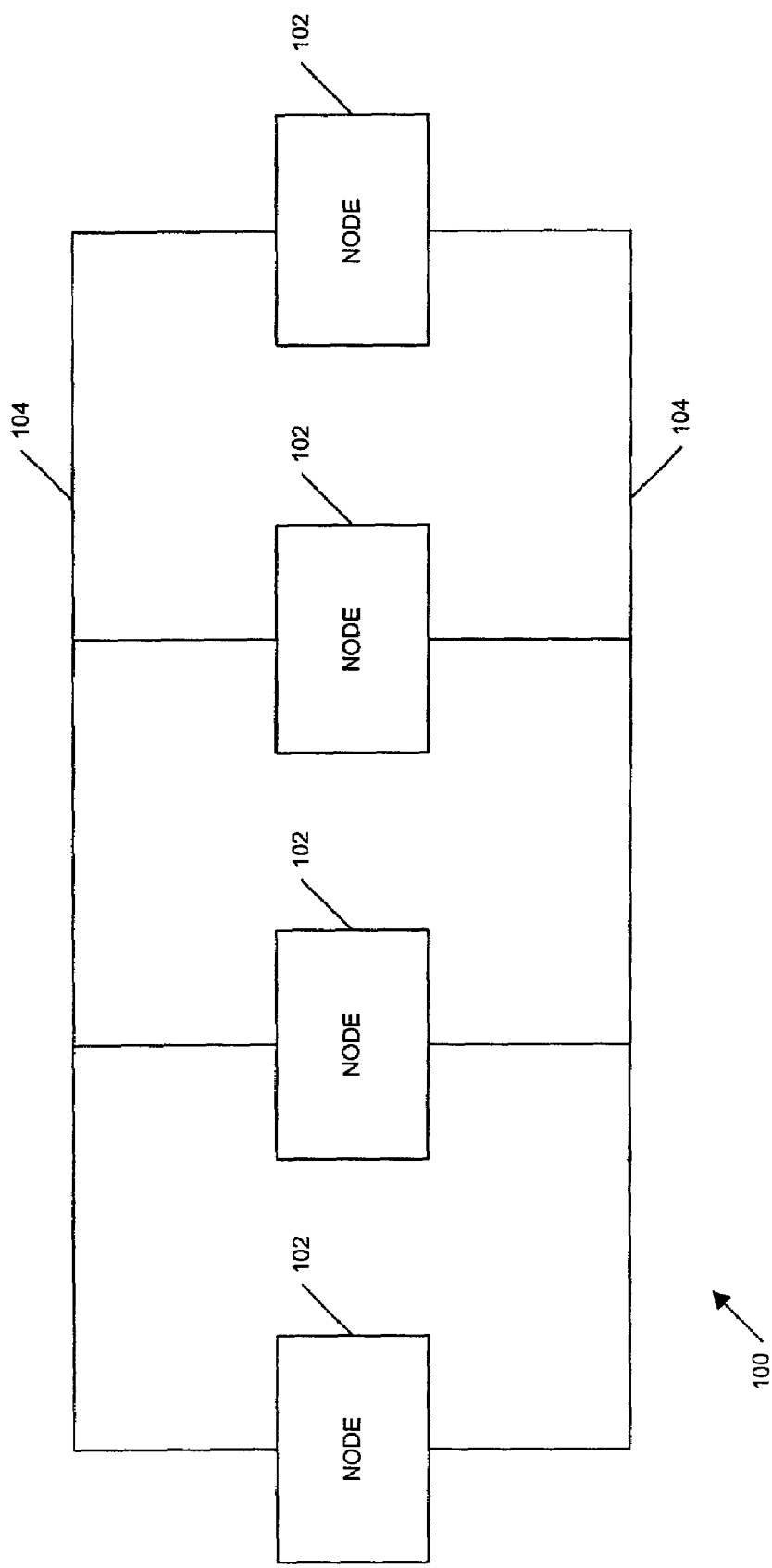
FIG. 1 illustrates a typical computer system within which the various embodiments of the present invention can be practiced.

FIG. 1 illustrates a typical computer system 100 within which the various embodiments of the present invention can be practiced. System 100 includes multiple nodes 102 interconnected by one or more communication networks 104. A "node," as used herein, refers to a distinct processing element of a computer system, which could be co-located with or remote from other nodes of the computer system. For example, some or all of the multiple nodes 102 could be stand-alone computers within a networked computer system. Alternatively, some or all of the multiple nodes 102 could be processors that are co-located within a single computer or facility, and which are networked together.

Although FIG. 1 illustrates four nodes 102 and two networks 104, a system could include more or fewer nodes interconnected by more or fewer networks 104. An advantage to interconnecting nodes 102 using multiple networks is that it provides hardware redundancy. This means that, if one network fails for any reason, nodes 102 still can communicate using the remaining one or more functioning networks.

Messages relating to operating in the master-slave configuration are referred to herein as "master-slave messages." In one embodiment, each node 102 sends some or all master-slave messages over multiple networks 104. Networks 104 could be any of various types of networks. For example, some or all networks 104 could be Ethernet links, DSL systems, telephone systems, the Internet, or combinations of these or other types of networks. In one embodiment, some or all of networks 104 are "bus" type networks, where each node connects to a single communication link. In bus type networks, when a node places a message on the network 104, the node 102 essentially "broadcasts" the message to all other nodes on the network 104. In another embodiment, some or all of networks 104 could be point-to-point networks, where message broadcasting is simulated.

Each node 102 includes one or more processors and one or more external network interfaces (e.g., ports). Each network interface allows a node 102 to send and receive messages from an external network 104. For example, a particular network interface could be an Ethernet port, fast Ethernet port, DSL port, or cable modem. In one embodiment, each network interface is a TCP/IP network interface, although other types of interfaces could be used, in other embodiments.

Each node 102 may be capable of running one or more different types of applications. In one embodiment, an application type can be virtually any type of software program that is executed using a master-slave configuration. For example, application types can include routers (e.g., IP and SCSI routers), login tasks, time synchronization tasks, and many other types of applications.

Some types of applications can initiate multiple "instances" of themselves on the same node, where an "application instance" is defined herein as a separately executable instance of a particular application type. An application instance can be, for example, a daemon, task, application program, or other type of software program that is executed by the node. For example, if a node is running an IP router, the node may simultaneously execute multiple instances of the router, where each instance is responsible for routing data between different destinations.

A node 102 that is primarily responsible for (i.e., actually "running") an application instance is considered a "master" for that application instance, and all other nodes 102 are considered "slaves" (or "backups") for that application instance. Any node 102 could be a master for one or more application instances, and/or a slave for one or more other application instances.

During steady state operations, only one master is present in the network for any particular application instance, and only the master actually executes the application instance's central task. The slaves, on the other hand, do not execute the application instance's central task, but are available to perform peripheral tasks and/or to take over the execution in the event that the master fails or resigns, for any reason. This situation is referred to as a "fail over," where one of the slaves becomes the master for a particular application instance.

In one embodiment, during steady state operations, each node is aware of all application instances being executed in the network. Each node executes a task for those of the application instances that the node is a master or a slave. For convenience, this task is referred to as a "main master-slave task" or "main task," although the term "task" is not meant to imply that the various embodiments are limited to use in any particular operating system. For the purposes of brevity and ease of description, the term "application instance" means any node function, operating system function, application or application instance whose communications relating to master-slave operation are being managed by a main task.

For each application instance, the main master-slave task on each node coordinates the transfer of state-related and "Heartbeat" messages between nodes, and also manages state transitions (e.g., master-to-slave, slave-to-candidate, etc.) in accordance with a defined state diagram.

Various aspects and details of the present invention will be depicted by FIGS. 2-9 and the associated description, below. First, the operation of the main master/state task will be described in conjunction with FIG. 2.

Briefly, the main master-slave task is initialized upon boot up of the node or later. In one embodiment, the main task is then periodically invoked, and also invoked in response to receipt of a message, as will be described in detail below. The major functions of the main task are:

1) to initiate and maintain state machines for application instances operating in the master-slave configuration across the network; and
2) to respond to state timer timeouts, messages, and other events.

Initialization of the main task includes the creation of a table, referred to herein as an "application instance state table" or "state table." The application instance state table indicates the current state of each application instance, across the network, which is being operated in the master-slave configuration. Accordingly, in one embodiment, the state table enables the main task to perform the first of its major functions, which is initiating and maintaining state machines for application instances across the network.

FIG. 2 is an example of an application instance state table 400 in accordance with one embodiment of the present invention. For each application instance, the table 400 has a field for the application type 402, application instance identifier (application ID) 404, current state 406, new configuration flag 414, and a configuration ID 416. As shown in FIG. 2, the application type 402, application ID 404, new configuration flag 414, and configuration ID 416 are designated with integers, and the current state 406 is designated with ASCII values, although they could be designated with other types of characters (e.g., other types of arrays of signed or unsigned characters, or binary or hexadecimal values).

In one embodiment, each application instance is defined by two items of information: the application type 402; and the application ID 404. As its name implies, the application type 402 indicates the type of application (e.g., SCSI router, IP router, or other types) that the application instance corresponds to. In one embodiment, the designators used for the application type 402 are globally known, but they might not be, in another embodiment.

The application ID 404 is an identifier that uniquely identifies each application instance of a particular type to all nodes of the network. For example, the entry 420 having application type "433" has application ID "1037." All nodes of a particular type would be able to uniquely identify the application instance by the application type "433" and application ID "1037." Therefore, the combination of the application type 402 and application ID 404 enables the various nodes to communicate regarding particular application instances. In another embodiment, in which only one application type exists, the application type 402 is not used, and instead the node uses only the application ID 404 to identify the application instance. As indicated by entries 420 and 424, identical application IDs 404 can be assigned if their application types 402 are different. Thus, entries 420 and 424 have identical application IDs of "1037," but different application types of "433" and "763," respectively. The current state 406 indicates the state that each application instance is currently in. For example, in the example shown, entries 420, 422, and 426 are in the master state.

As mentioned previously, each slave attempts to maintain the most up to date configuration information, in one embodiment. Maintenance of current configuration information enables a slave to more rapidly take over as a master, if the need arises. Accordingly, in one embodiment, each entry in the application instance state table 400 also includes a new configuration flag 414 and a configuration ID 416.

These fields enable a node to determine whether or not the configuration information has changed for the corresponding application instance. A configuration change would be a change of the configuration information that is used by the master, and which should be used by the slaves, for a particular application instance. In one embodiment, a configuration change is indicated by the new configuration flag 414 corresponding to the selected entry. In other embodiments, a configuration change could be indicated by some other stored indicator or by a received message. As will be described in more detail later, the new configuration flag 414 is set during evaluation of a received Heartbeat message (see block 1022, FIG. 6), and is cleared by a new configuration task after the new configuration information has been received (see block 1214, FIG. 7).

The configuration ID 416 includes a value that uniquely identifies the most current configuration version that a node should be able to access. This enables the node to obtain the most current configuration version in the event that the new configuration flag 416 indicates that the node does not currently have the most current version.

Entries for various application instances are added to the table 400 upon boot up of the node, and also later, as various application instances are started on the node or discovered on the network. Once added to the table, an application instance is referred to herein as a "registered application instance." In order for an application instance being run on the node to register itself, the application instance sends a message to the main task, which includes the application ID for the application. The main task, in turn, creates a table entry in the state table 400 for each of these "configured applications" (i.e., applications that are initialized and registered upon boot up). During operation, the main task can create new table entries, as well, for applications or application instances that are detected in other nodes, or that are started (e.g., automatically or from a console connected to the node) and register themselves after boot up.

In one embodiment, the node also maintains one entry (e.g., entry 428) in the null state, which is waiting to detect a new application instance within the node or elsewhere on the network. This entry corresponds to a "null application instance," and not to any particular application type. Accordingly, the application type 402 and application ID 404 fields can be null or blank for this entry. Once a new application instance is discovered, the null state entry 428 will be assigned an application type 402 and application ID 404, and it will be transitioned out of the Null State toward either the slave state or the master state. As the above description indicates, state machines for application instances are initiated by adding entries to the state table 400.

Besides being defined by the application type and application ID, each application instance is also defined by a "cluster identifier" (cluster ID), in another embodiment. The cluster ID indicates to which "cluster" of application instances the particular application instance belongs. The concept of clusters enables grouping of application instances and/or application types.

The main master-slave task is executed periodically, and also can be executed upon the occurrence of some event (e.g., a monitor, resignation or message event). Basically, the main master-slave task is responsible for managing state transitions, and for receiving, processing, and sending out Heartbeat and other messages. This is achieved, in one embodiment, using an application instance state table, such as the table 400 described in conjunction with FIG. 2.

Figure 3:
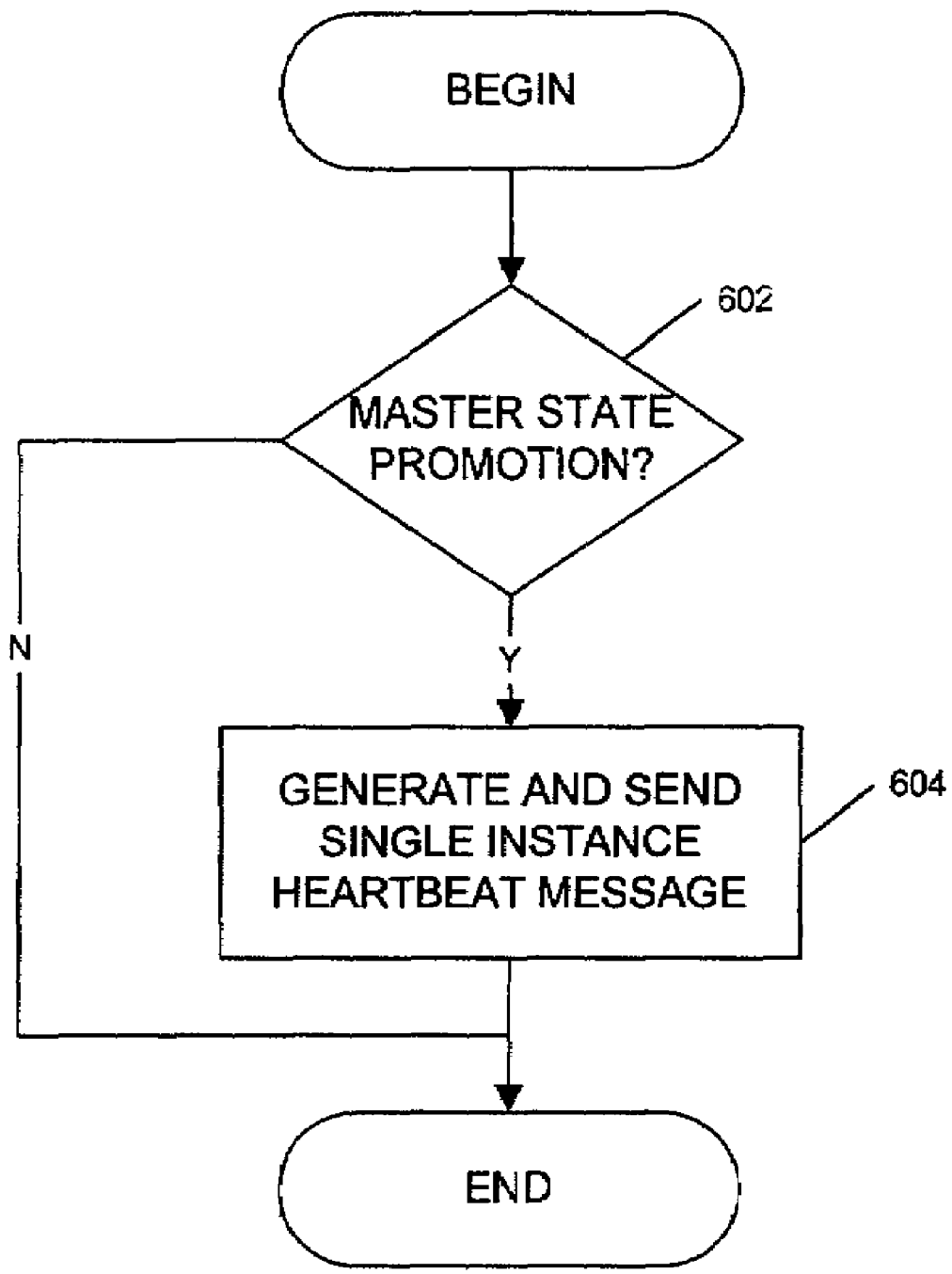
FIG. 3 illustrates a flowchart of a method for a node to generate and send a single instance Heartbeat message in accordance with one embodiment of the present invention.

FIG. 3 illustrates a flowchart of a method for a node to generate and send a single instance Heartbeat message in accordance with one embodiment of the present invention. The single instance Heartbeat message indicates that the associated master application instance is functioning properly. The method begins, in block 602, by determining whether an application instance has just been promoted to the master state.

Figure 5:
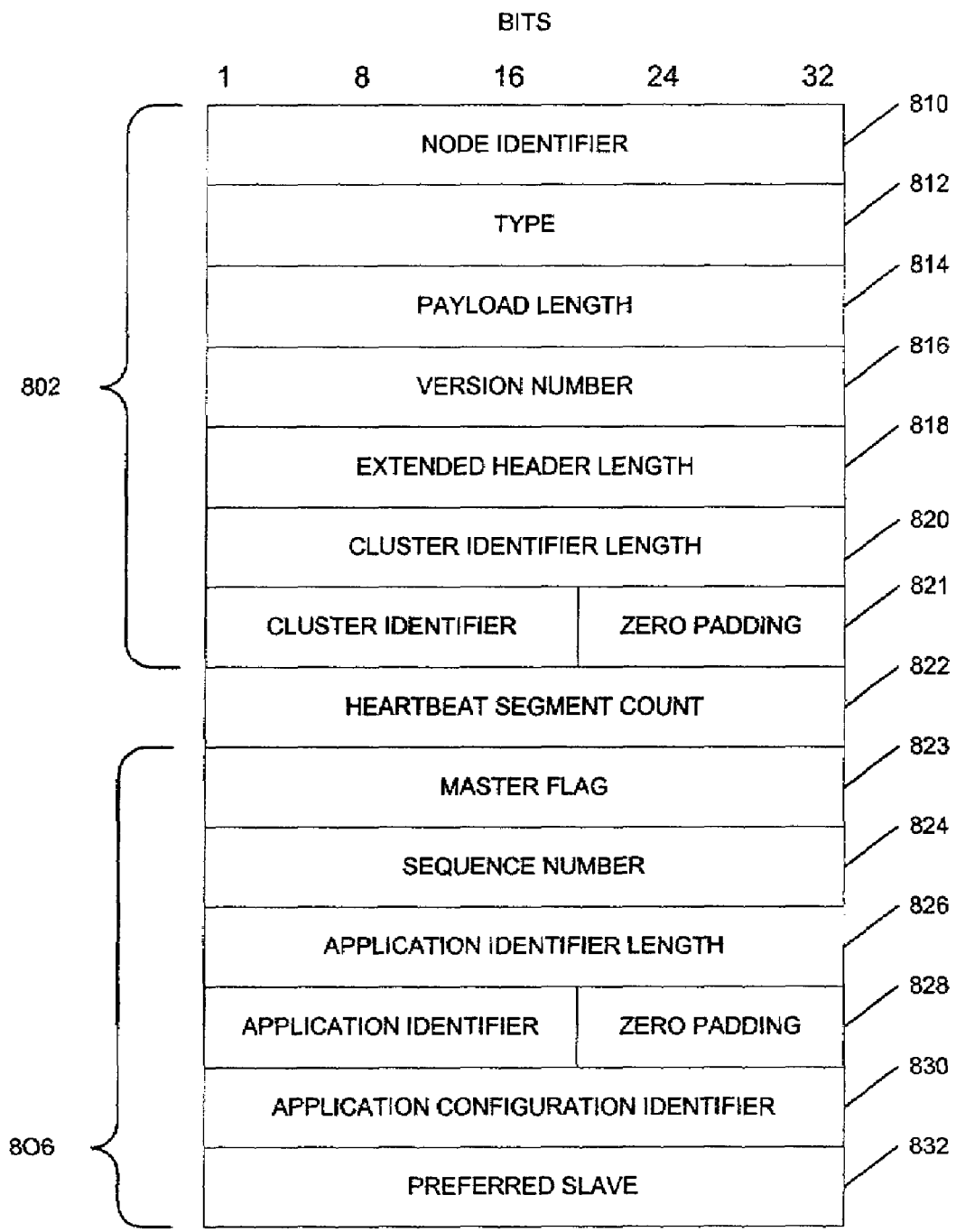
FIG. 5 illustrates a diagram of a multiple instance Heartbeat message format in accordance with one embodiment of the present invention.

If not, the method ends. If so, then a single instance Heartbeat message is generated, in block 604. A single instance Heartbeat message includes several items of information. Referring also to FIG. 5, which will be described in more detail later, a single instance Heartbeat message includes a node identifier (field 810), a message type (field 812), and an application identifier (field 828). The node identifier (field 810) specifies the identity of the node that is sending the Heartbeat message. The message type (field 812) indicates that the message is a Heartbeat message. Finally, the application identifier (field 828) specifies the identity of the application instance that was just promoted to the Master State. In one embodiment, the Heartbeat message includes other fields, as well, but those fields will be described in more detail later.

Referring back to FIG. 3, after the single instance Heartbeat message has been generated, the node sends the Heartbeat message out over one or more networks, in block 604, and the method ends. In an alternate embodiment, the node could wait until a later time before it sends out the message.

Figure 4:
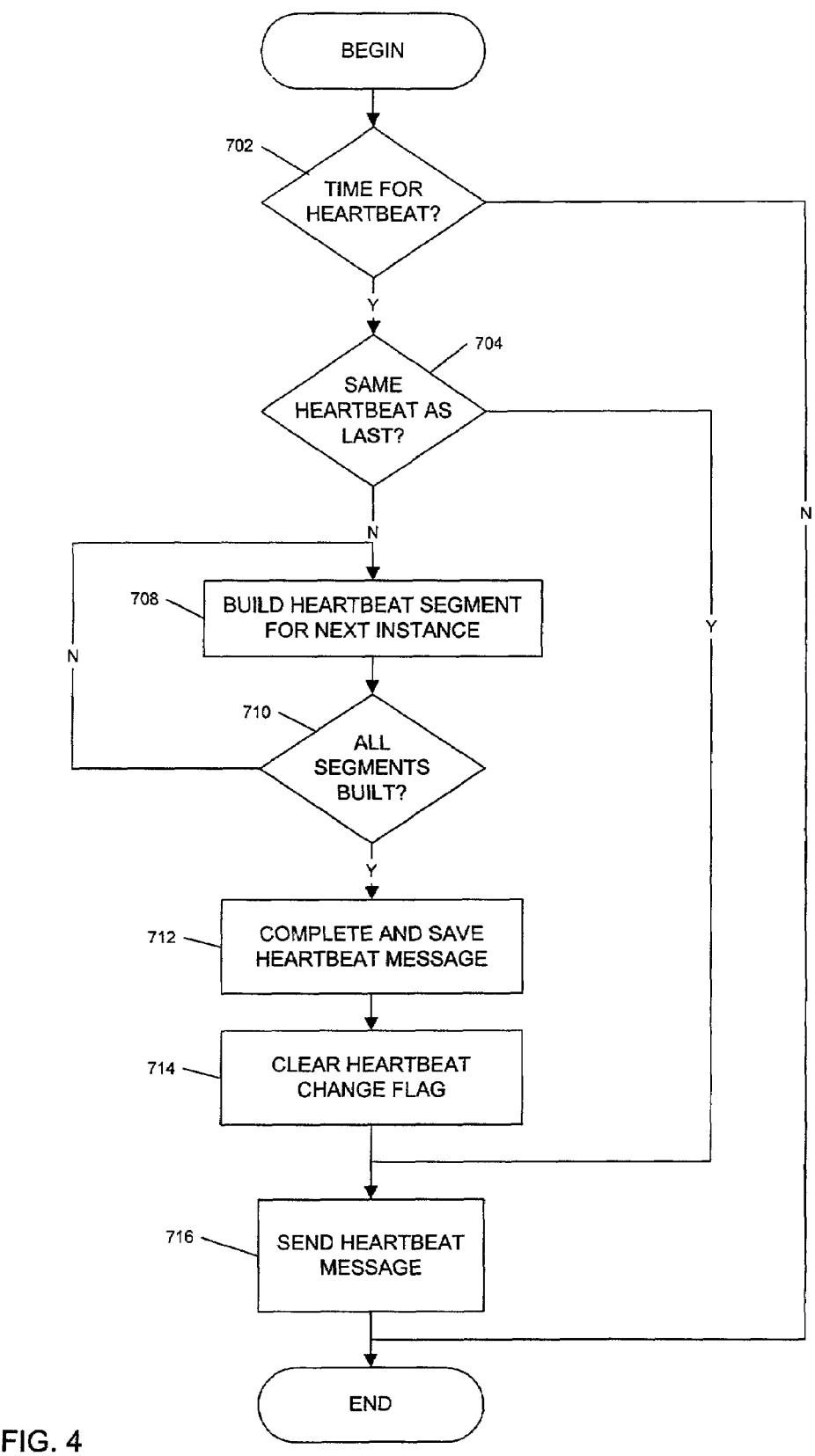
FIG. 4 illustrates a flowchart of a method for a node to generate and send a multiple instance Heartbeat message in accordance with one embodiment of the present invention.

FIG. 4 illustrates a flowchart of a method for a node to generate and send a multiple instance Heartbeat message in accordance with one embodiment of the present invention. A multiple instance Heartbeat message includes a "heartbeat segment" for at least one, and potentially many, master and/or slave application instances. Each heartbeat segment included in the message indicates that the associated master or slave application instance is functioning properly.

The method begins, in block 702, by determining whether it is time to generate a multiple instance Heartbeat message. This is indicated, in one embodiment, when at least one of the application instances was a master or slave application instance that had timed out. In addition or alternatively, the method could have set aside all information necessary to build a heartbeat segment for each master or slave application instance. If it is determined, in block 702, that it is not time to generate a multiple instance Heartbeat message, then the method ends.

If it is determined that it is time to generate a multiple instance Heartbeat message, then a determination is made, in block 704, whether the Heartbeat message is identical to the last multiple instance Heartbeat message sent out by the node (e.g., during the last time the main master-slave task was executed). In one embodiment, each transmitted Heartbeat message is saved (e.g., in block 712, described later) until it becomes necessary to generate a new Heartbeat message.

The determination of block 704 is made, in one embodiment, by checking a "heartbeat change flag." The flag is cleared (e.g., in block 714, described later) each time a new multiple instance Heartbeat is sent out. The flag is set, for example, when a configuration has changed for an application instance, or when an application instance enters or leaves the Master State or the Slave State (e.g., in block 518, FIG. 5), or when one or more application instances fail as a master or are incapable of being a slave. In such cases, a new heartbeat segment would be needed for the application instance, and thus the next Heartbeat message would be different.

If block 704 indicates that the new Heartbeat message is identical to the previously sent Heartbeat message, then the previously sent Heartbeat message is retrieved and sent, in block 706, and the method ends. If block 704 indicates that the new Heartbeat message is not identical to the previously sent Heartbeat message, then a new Heartbeat message is generated in blocks 708-714.

In block 708, a heartbeat segment is built for the first (or next) master or slave application instance having an expired state timer. Referring again to FIG. 5, and similar to the single instance Heartbeat message, each multiple instance Heartbeat message has a node identifier 810, a message type 812, and one or more application identifiers 828. The node identifier 810 and the message type 812 are included in a Heartbeat message header 802. The application identifier 828 is included in a heartbeat segment 806. In one embodiment, the application identifier 818 is obtained from the application instance state table (e.g., table 400, FIG. 2), although it could be obtained elsewhere.

Each Heartbeat message includes a single header 802 and one or more heartbeat segments 806. Accordingly, for a single instance Heartbeat message, only a single heartbeat segment 806 is included. For a multiple instance Heartbeat message, a heartbeat segment 806 is included for each master and/or slave application instance whose state timer expired. This means that a multiple instance Heartbeat message could include from one to many heartbeat segments 806. A more detailed description of FIG. 5 is given later.

In one embodiment, if the Heartbeat message is at all different from the previously sent Heartbeat message, then all heartbeat segments are rebuilt, regardless of whether each individual segment would be different. In another embodiment, only those heartbeat segments that are different are rebuilt.

After building the heartbeat segment for the next master or slave application instance, a determination is made, in block 710, whether all segments have been built. For example, all segments would be considered built if a segment had been built for each timed out master and/or slave application instance in the application instance state table (e.g., table 400, FIG. 2). If all segments have not been built, then the procedure iterates as shown.

If all segments have been built, then the Heartbeat message is completed and saved, in block 712. Completing the Heartbeat message includes concatenating the header (e.g., header 802, FIG. 5) with the heartbeat segments (e.g., segment 806, FIG. 5), and adding other information or addressing layers, as needed. In another embodiment, the header could be built at an earlier time.

In block 714, the heartbeat change flag, which was evaluated in block 704, is then cleared, in one embodiment. As described previously, the heartbeat change flag can be used to determine whether something has occurred (e.g., a configuration change, state transition or application instance failure) that would somehow change the next Heartbeat message to be sent out. The Heartbeat message is then sent out over one or more networks, in block 716. In an alternate embodiment, the node could wait until a later time before it sends out the message. After sending out the Heartbeat message, the method ends.

FIG. 5 illustrates a diagram of a multiple instance Heartbeat message format in accordance with one embodiment of the present invention. In one embodiment, each message field 810-832 is in a long-word aligned, 32-bit format, rather than an 8-bit byte format, as was used for the TSP protocol of the prior art. Accordingly, the message format of this embodiment is better suited for modern computers, which work more efficiently on long-word aligned messages. The format makes message creation and processing easier, and avoids masking and shifts, to a large extent. In other embodiments, the message fields could have more or fewer bits, as is appropriate for the network and computer systems upon which the present invention is implemented.

The Heartbeat message format includes a header 802 and a payload. In one embodiment, the payload consists of one or more heartbeat segments 806. For a single instance Heartbeat message, only a single heartbeat segment 806 exists in the message. For a multiple instance Heartbeat message, anywhere from one to many heartbeat segments 806 are concatenated together within the message. Because the number of heartbeat segments 806 can vary from message to message, a heartbeat segment count field 822 is also present in the Heartbeat message. Basically, the segment count 822 indicates how many heartbeat segments 806 are present in the Heartbeat message. The segment count 822 could be, but is not necessarily, part of the header 802. The header 802 includes several fields: a node identifier 810; message type 812; payload length 814; version number 816; extended header length 818; cluster identifier length 820; and cluster identifier 821. The node identifier field 810 includes a value, which uniquely identifies the node from which the message was sent. The message type field 812 includes a value, which indicates what type of command or response the message is.

The payload length field 814 includes a value, which indicates the total size of the message's payload. This allows the node to perform buffer size comparisons against the size of the message payload to be processed. In some cases, elements of the payload may be zero-padded. In one embodiment, the length of the zero padding is included in the payload length. In another embodiment, the payload length field 814 could be used as a message length field and could include a value indicating the length of the entire message being processed, rather than just the payload length. As described above, the heartbeat message has a format that allows multiple heartbeat segments to be included within the heartbeat message, and the payload length field 814 enables the number of segments to be determined. In other embodiments, the number of heartbeat segments could be indicated in some other way (e.g., by including an integer value that indicates the number of segments).

The version number field 816 includes a value, which indicates the protocol version number of the message. For example, the initial version of the protocol could have a version number of "1." Future updated versions, which could include changes to message contents or format, would have higher (or different) version numbers. The version number enables the receiving node to know the protocol version on which the node should base its processing of the message.

Similarly, the extended header length field 818 includes a value, which indicates how much longer the header 802 is for the new protocol version, if at all longer. For the initial version, the value would likely be "0." By including the version number field 816 and the extended header length field 818, nodes that cannot process all the elements of the current version of the protocol are still able to process those fields that are known. Accordingly, the header format enables both backward and forward compatibility.

In one embodiment, the header 802 also includes two fields 820, 821, which help to identify a "cluster" of nodes for which the message is pertinent. A cluster is a named, virtual group of nodes, interconnected by one or more networks. The nodes in a cluster send each other Heartbeat messages and act as masters and slaves for each other for various application instances. The concept of clusters enables grouping of application instances and/or application types. In one embodiment, each node is a member of only one cluster. In other embodiments, a node could be a member of more than one cluster.

The cluster for which the message is pertinent is identified in a cluster identifier field 821 of header 802. In one embodiment, the cluster identifier is an array of unsigned characters that is padded out to the nearest long word address. Therefore, the cluster identifier field 821 may contain one or more bits of padding (e.g., zero padding). In order to identify the length of the cluster identifier, the header 802 also includes a cluster identifier length field 820, in one embodiment. The cluster identifier length specifies the true length of the cluster identifier, minus any padding.

As described previously, each message also includes a payload that consists of one or more heartbeat segments 806. In one embodiment, the heartbeat segment 806 includes several fields: a master flag 823; a sequence number 824; application identifier length 826; application identifier 828; an application configuration identifier field 830 and a preferred slave field 832. In other embodiments, these fields could be in different orders, and/or some fields could be excluded, and/or other fields could be included in the message.

The master flag 823 includes a value, which indicates whether the node that created the message (as identified by node ID 810) is the master of the application instance associated with the heartbeat segment. In one embodiment, the flag 823 is set if the node is the master, and is cleared if the node is a slave.

It is not imperative that messages receive responses, in accordance with one embodiment. However, certain message exchanges do hope for a request-response sequence. Therefore, in one embodiment, a sequence number is included with some or all messages. In one embodiment, no responses are expected for Heartbeat messages. Therefore, a sequence number may or may not be included in the message. Regardless, the sequence number is described in detail below.

The sequence number field 824 includes a sequence number, which is incremented for every request message that a master creates and sends for a particular application instance. In one embodiment, slaves do not maintain a sequence number to identify requests that it sends, because slaves rarely (or never) send such requests. In another embodiment, each slave does maintain a sequence number for requests that it sends. In still another embodiment, sequence numbers are not needed, and therefore are not used by masters or slaves at all.

A response that a slave makes to the master's request message uses the same sequence number that was in the master's request message. Therefore, the sequence number enables the master to associate a slave's response to the associated, previously-sent request.

In one embodiment, each slave keeps track of a master's sequence number for each application instance. This enables a slave to avoid reacting to or responding to previously received messages. In other words, the sequence number enables the slave to identify duplicate messages, such as duplicate messages that a master sends out on multiple networks.

In one embodiment, when a slave is promoted to a master for an application instance, the slave uses an incremented continuation of the sequence number used by the previous master. By using a continuation of the sequence number, other slaves will not reject the new master's messages as having been previously sent or unrecognized.

The application instance for which the message is pertinent is identified in an application identifier field 828. In one embodiment, the application identifier includes the application type and the particular application instance ID to which the message pertains (i.e., the destination application instance). The application identifier is an array of unsigned characters that is padded out to the nearest long word address. Therefore, the application identifier field 828 may contain one or more bits of padding (e.g., zero padding). In order to identify the length of the application identifier, the heartbeat segment 806 also includes an application identifier length field 826, in one embodiment. The application identifier length specifies the true length of the application identifier, minus any padding.

The application configuration identifier field 830, which forms a portion of a heartbeat segment 806, indicates an identifier of the current configuration of the database, if any, that a master is using for a particular application instance. This enables slaves to determine whether the configuration information that they are using is correct or is outdated. In the event that the configuration information that a slave is using is outdated, the slave node can request the correct configuration information from the master or elsewhere. The process of evaluating and requesting configuration information is described in detail later.

Finally, the heartbeat segment 806 includes a preferred slave field 832. The preferred slave field 832 includes a value that identifies which of the potential slaves is preferred as the new master, in the event that the current master resigns or is unable to continue serving as the master for an application instance.

Although the description of FIG. 5, above, specifies a number of different message fields 810-832 arranged in a certain order, more, fewer or different message fields could be included in other embodiments, and these message fields could be arranged in different orders than the order shown in FIG. 5.

As described previously, the main master-slave task can execute periodically or the task can execute when an event occurs (e.g., a monitor, resignation or message event). A message event can be, for example, a receipt of a message from a remote node that warrants a state transition in the local node.

Figure 6:
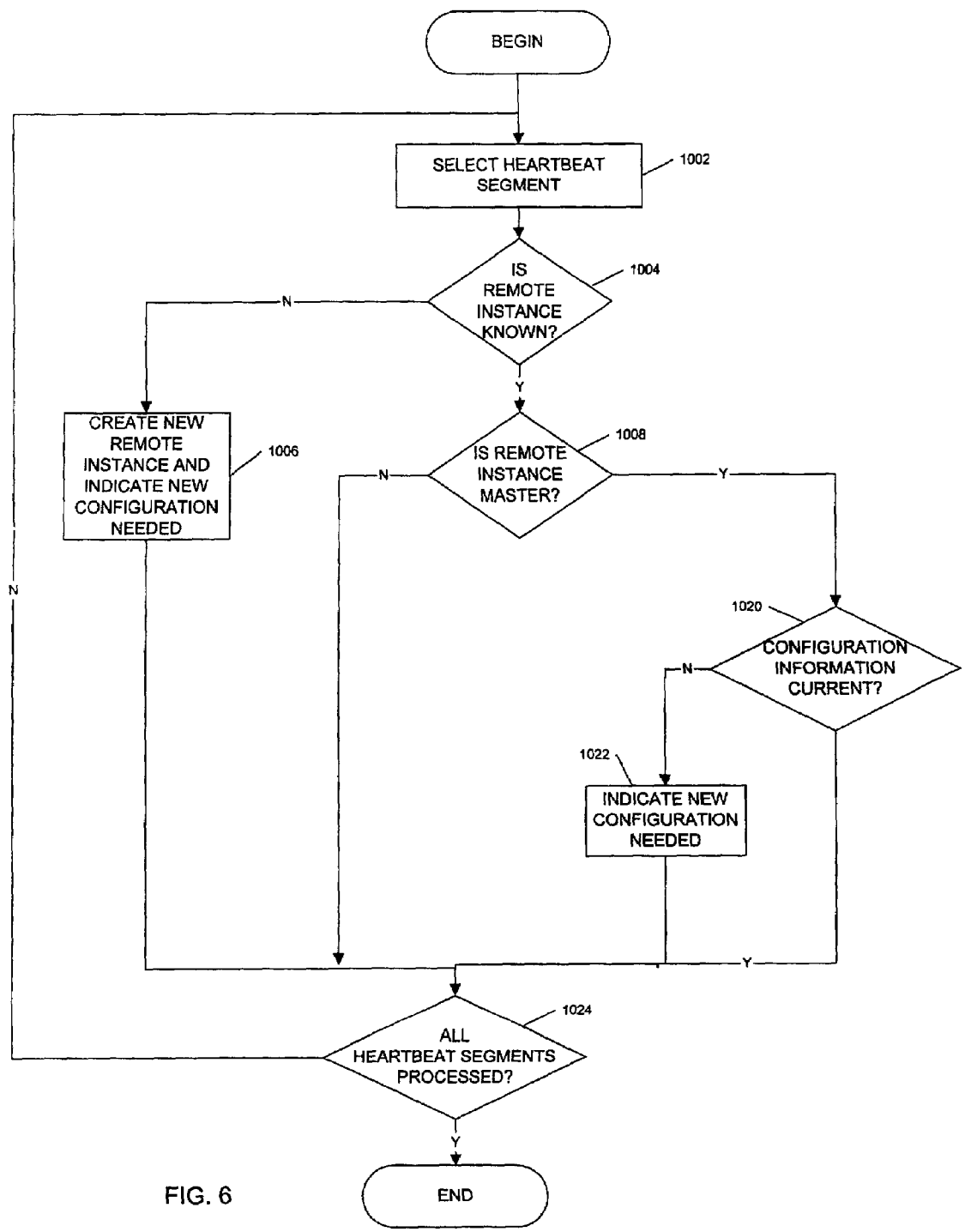
FIG. 6 illustrates a flowchart of a method for a node to receive and process a heartbeat message in accordance with one embodiment of the present invention.

FIG. 6 illustrates a flowchart of a method for a node to receive and process a Heartbeat message in accordance with one embodiment of the present invention. In one embodiment, receiving a Heartbeat message from a remote node is considered a message event, which causes the main master-slave task to be invoked. The method begins after a Heartbeat message has been received from a remote node. After the message has been validated, a heartbeat segment is selected for processing, in block 1002. The message is considered valid, for example, if the header information indicates that the message is a Heartbeat message from a remote node.

As described previously, a heartbeat segment (e.g., segment 806, FIG. 5) is a segment of the message that pertains to a particular application instance. In one embodiment, the first heartbeat segment following the message's header is initially selected for processing. During later iterations of the method, if any are necessary, the next sequential heartbeat segment is selected for processing, and so on. In another embodiment, the heartbeat segments could be selected in a different order.

In block 1004, a determination is made whether the remote application instance identified in the heartbeat segment (e.g., by the application identifier 828, FIG. 5) is known to the local node. In one embodiment, the remote application instance would be known if an entry with the same application identifier (e.g., field 404, FIG. 2) exists in the application instance state table (e.g., table 400, FIG. 2) stored at the local node.

If the remote application instance is not known, then the local node creates a new remote instance and indicates that new configuration information is needed, in block 1006. In one embodiment, this is done by adding a new table entry to the application instance state table, where the new entry includes the application identifier (e.g., in field 404, FIG. 2) of the remote instance, and where the state (e.g., field 406, FIG. 2) of the instance is set to "slave." In addition, the new configuration flag (e.g., field 414, FIG. 2) is set to indicate that the node should obtain configuration information, if any, for the new application instance. In one embodiment, the system (e.g., the operating system) is notified that a new application instance exists, which gives the system the opportunity to allocate memory and/or other resources, if necessary.

If, as determined in block 1004, the remote instance is known, then a determination is made, in block 1008, whether the remote instance is a master. In one embodiment, this determination is made by checking a master flag (e.g., flag 823, FIG. 5) within the heartbeat segment 806. If the flag is set, then the remote instance is presumed to be the master for the application instance, in one embodiment. If the flag is cleared, then the remote instance is presumed not to be the master. If the remote instance is not master, then new configuration information is not needed and the process proceeds to block 1024, described later, to process the next heartbeat segment, if any.

If the remote instance is master, as determined in block 1008, then a determination is made, in block 1020, whether the configuration information for the application instance is considered current. This determination is made, in one embodiment, by comparing the application configuration identifier (e.g., field 830, FIG. 5) corresponding to the remote application instance with a stored configuration identifier for the local application instance (e.g., in field 416, FIG. 2). If the configuration information is current, then the process proceeds to block 1024, described later. If the comparison indicates that the local node does not have the newest configuration information for the application instance, then an indication is made, in block 1022, that a new configuration is needed. In one embodiment, this is done by setting a new configuration flag (e.g., flag 414, FIG. 2) and changing the configuration ID (e.g., field 416, FIG. 2) to the new configuration identifier, which was included in the heartbeat segment.

After the heartbeat segment has been evaluated, in blocks 1002-1022, a determination is made, in block 1024, whether all heartbeat segments (e.g., all segments 806, FIG. 5) within the received Heartbeat message have been evaluated. In one embodiment, this is done by comparing the number of heartbeat segments evaluated with the heartbeat segment count 822 (FIG. 5) within the Heartbeat message. If all heartbeat segments have not been evaluated, then the next heartbeat segment is selected for evaluation, in block 1002, and the method iterates as shown. If all heartbeat segments have been evaluated, then the method ends. As described previously, a single instance Heartbeat message would include only one heartbeat segment. For such a message, only one iteration of the method would be performed. In contrast, a multiple instance Heartbeat message could include from one to many heartbeat segments, so from one to many iterations of blocks 1002-1022 would be performed.

As described previously, in one embodiment, a separate "monitor task," exists to monitor, for correct operation, those application instances that are in the master state on the node. In addition, the monitor task can monitor the operation of the node itself and/or various functions or components associated with the node (e.g., the CPU, memory, operating system, temperature or radiation sensor, power supply, etc.). For ease of description, the term "application instance" is meant to refer to any entity that is being monitored by the monitor task, including but not limited to, applications, application instances, the node, and/or various software or hardware components associated with the node. Each application instance that wants to be monitored for correct operation "registers" itself by sending a message to the main task. This message identifies the application instance, and also includes the criteria that the monitor task should use to determine whether or not the application instance is operating correctly. The operating system and/or the node itself can also ask the monitor task to monitor particular functions for correct operation, in one embodiment. For example, the node may ask the monitor task to periodically check the value of a sensor that measures the temperature of the node, a component, or the atmosphere. As another example, the operating system may ask the monitor task to periodically check certain performance metrics, such as operating system throughput, for example.

Figure 7:
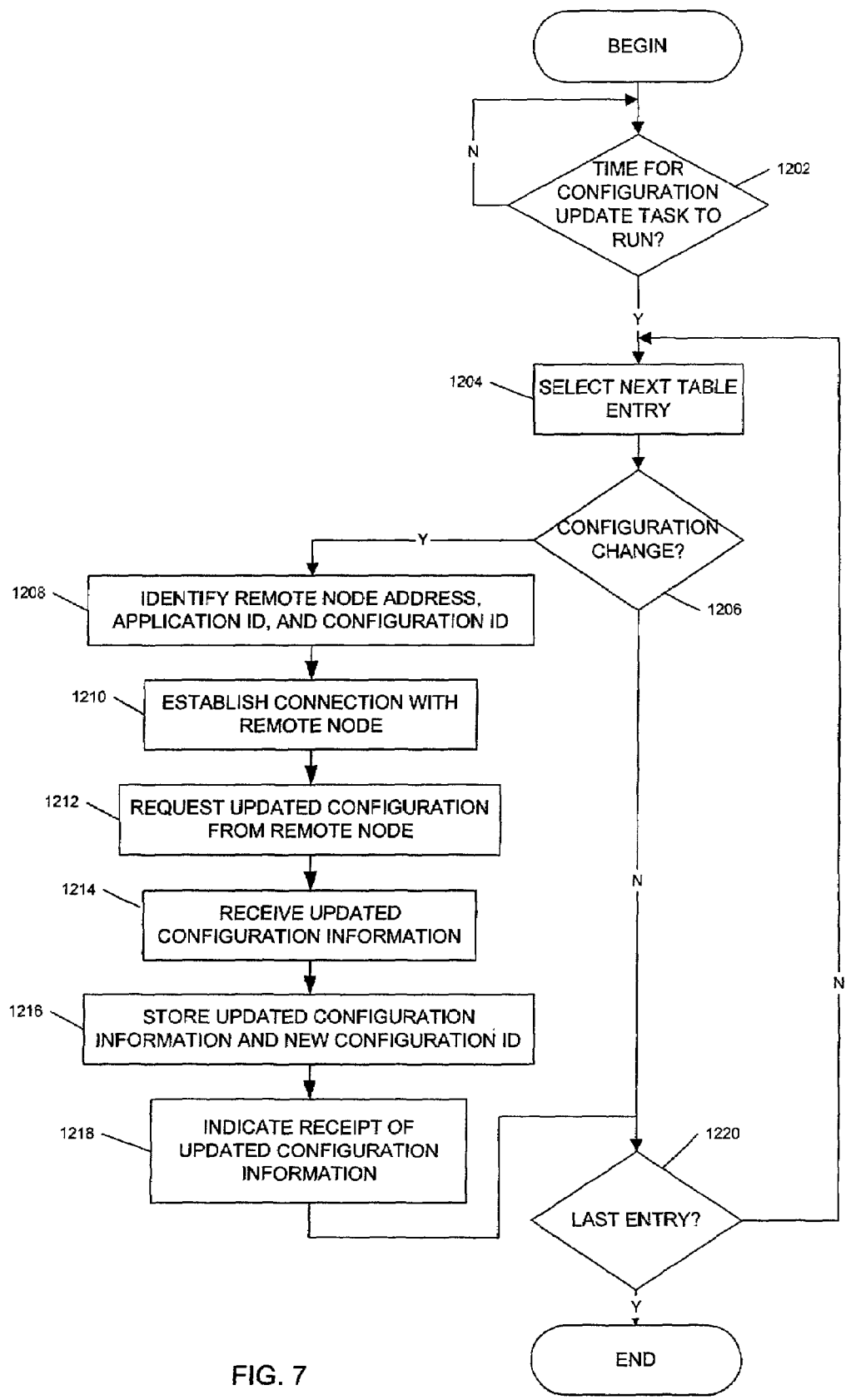
FIG. 7 illustrates a flowchart of a method for a new configuration task to execute in accordance with one embodiment of the present invention.

FIG. 7 illustrates a flowchart of a method for a new configuration task to execute in accordance with one embodiment of the present invention. In one embodiment, the method begins, in block 1202, when a determination is made that it is time for the configuration update task to run. The new configuration task could be run upon the occurrence of some event, in one embodiment. For example, a node could receive a message indicating that a new configuration is available, and that message could invoke execution of the new configuration task. Alternatively, the node could send an internal message indicating that a configuration is not current or has been corrupted, which also could invoke the configuration task.

In other embodiments, the new configuration task could be run periodically (e.g., upon expiration of a timer) or as part of the main master-slave task. In the latter case, it would be time for the new configuration task to run when it is time for the main master-slave task to run. In such an embodiment, some of the blocks shown in FIG. 7 would not be necessary, as they would already be performed as part of the main master-slave task.

If it is time for the configuration update task to run, then the next entry in the application instance state table (e.g., table 400, FIG. 2) is selected, in block 1204. In one embodiment, entries are evaluated in a top-down, sequential order, although the entries could be evaluated in a different order as well.

A determination is then made, in block 1206, whether a configuration change has occurred. A configuration change would be a change of the configuration information that is used by the master, and which should be used by the slaves, for a particular application instance. In one embodiment, a configuration change is indicated by evaluating the new configuration flag 414 (FIG. 2) corresponding to the selected entry. In other embodiments, a configuration change could be indicated by some other stored indicator or by a received message.

If a configuration change is indicated, then information is identified, in block 1208, which enables the local node (e.g., the slave) to obtain the updated configuration information from a remote node (e.g., the master or some other node). In one embodiment, this information includes the remote node address (e.g., the address of the master), the application identifier (e.g., application ID 404, FIG. 2), and the configuration identifier (e.g., configuration ID 416, FIG. 2) for the new configuration.

In block 1210, the local node establishes a connection with the remote node, specifically for the purpose of exchanging configuration information. This connection, referred to as a "data retrieval connection," is distinct from the interconnections between the various nodes for the purpose of exchanging master-slave type messages. However, the data retrieval connection can be made over one of the same networks that is used for master-slave type messages. Alternatively, the data retrieval connection can be made over a separate and distinct communication path.

In one embodiment, the data retrieval connection is an HTTP (Hyper-Text Transfer Protocol) connection, or a secure HTTP connection (e.g., HTTP over SSL (Secure Sockets Layer) or TLS (Transport Layer Security)). In alternate embodiments, the connection could be FTP (File Transfer Protocol), TFTP (Trivial FTP), or some other type of data retrieval connection.

Once the connection is established, the local node requests updated configuration information from the remote node, in block 1212. Eventually, the updated configuration information should be received by the local node, in block 1214. Upon receipt, the updated configuration information is stored, in block 1216. In addition, the stored configuration identifier associated with the application instance is changed to reflect the configuration identifier associated with the updated configuration information.

In one embodiment, the updated configuration information is sent by the remote node and received by the local node in a self-describing structured text format, which includes tags that specify attribute names. For example, the configuration information could be sent in the standard XML (Extensible Markup Language) format or some other proprietary or standard format. One advantage to formatting the configuration information using a structured text format is that it supports various data types and hierarchical data structures.

In one embodiment, upon receipt of the updated configuration information, the configuration identifier is re-computed locally to ensure that the updated configuration information is intact and correct. If it is not intact or correct, the out-of-date indicator remains in force.

As long as the updated configuration information is verified, and is received within any applicable time limits, then the new configuration task indicates receipt of the new configuration information in block 1218. In one embodiment, receipt of the updated configuration information is indicated by clearing the new configuration flag (e.g., flag 414, FIG. 2).

If no configuration change is indicated for the selected entry in block 1206, or after indicating receipt of the new configuration information in block 1218, a determination is made whether the selected entry is the last entry in the application instance state table (e.g., table 400, FIG. 2), in block 1220. If not, the procedure iterates as shown. If so, then the procedure ends.

Figure 8:
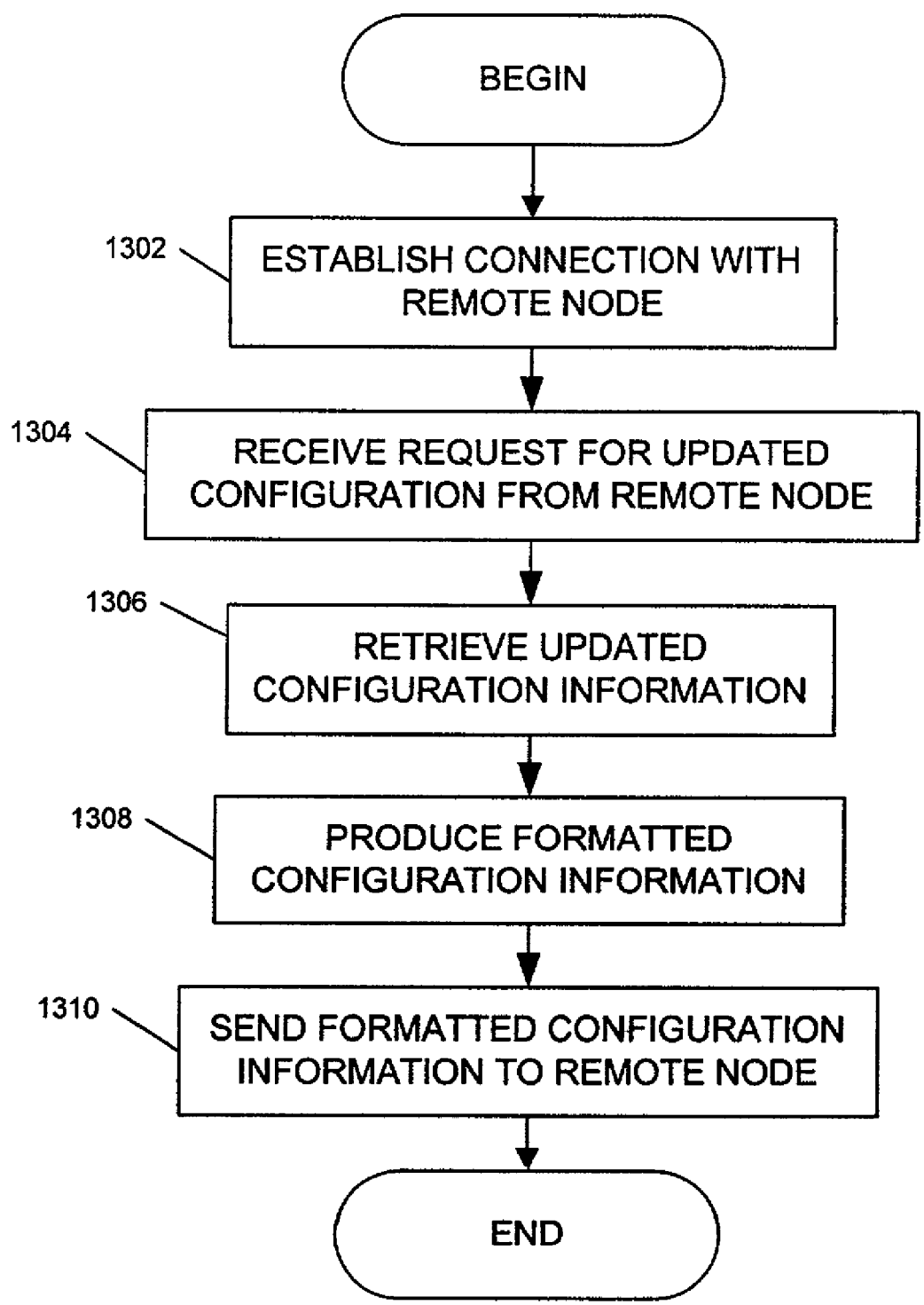
FIG. 8 illustrates a flowchart of a method for a node to format and send updated configuration information to a remote node in accordance with one embodiment of the present invention.

FIG. 8 illustrates a flowchart of a method for a node to format and send updated configuration information to a remote node in accordance with one embodiment of the present invention. The method is performed by a node that has access to updated configuration information, which the remote node is seeking to obtain.

The method begins, in block 1302, when the local node establishes a "data retrieval connection" (as described in conjunction with FIG. 7) with the remote node, specifically for the purpose of exchanging configuration information. In one embodiment, establishment of the connection would be initiated by the remote node that is seeking to obtain the updated configuration information.

Once the connection is established, the local node receives a request for the updated configuration information from the remote node, in block 1304. The node then retrieves the updated configuration information from a local or remote data storage device, in block 1306.

In one embodiment, the node then produces formatted configuration information, in block 1308, and sends the formatted configuration information to the remote node over the configuration connection, in block 1310. In one embodiment, the node formats the updated configuration information using a self-describing structured text format (e.g., XML). After sending the formatted configuration information to the remote node, the method ends.

Figure 9:
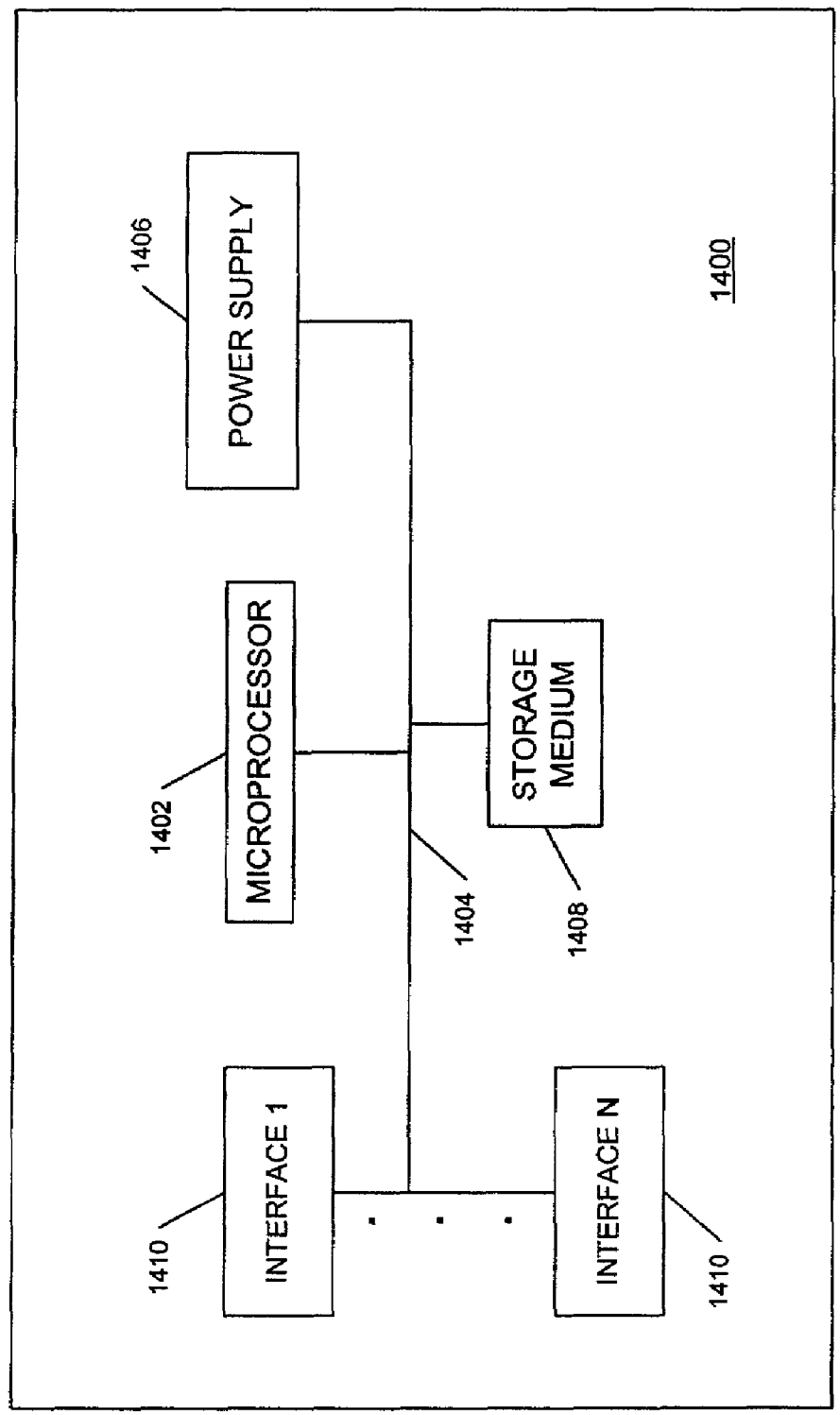
FIG. 9 illustrates a general-purpose computer within which functions of the various embodiments can be practiced in accordance with one embodiment of the present invention.

The functions of the various embodiments can be practiced on a general- or special purpose computer system. FIG. 9 illustrates a general-purpose computer system 1400 (e.g., a node) within which functions of the various embodiments can be practiced in accordance with one embodiment of the present invention. The computer system is housed on one or more PC boards, and includes one or more microprocessors 1402, power supplies 1406, storage media 1408, and from one to N interfaces 1410 to outside networks. In one embodiment, each of these devices is coupled to one or more busses 1404, so that signals and power can be exchanged between devices. In alternative embodiments, each of the devices could be coupled together through different connections.

Interfaces 1410 provide network connections between computer 1400 and one or more networks. Accordingly, interfaces 1410 enable the exchange of messages and information between computer 1400 and other nodes relating to operating one or more application instances in a master-slave configuration. These messages are processed and/or created by one or more microprocessors 1402 or other processing devices, in one embodiment. In addition microprocessor 1402 executes the main master-slave task, the monitor task, and the new configuration task, at various times, in accordance with the various embodiments of the invention.

Besides executing the various embodiments on a general-purpose computer system, computer executable instructions for performing the methods of the various embodiments can be stored on one or more computer readable media. For example, such computer executable instructions can be stored on RAM, ROM, hard drive, CD, magnetic disk, disk drive, a combination of these types of storage media, and/or other types of storage media that are well known to those of skill in the art.

CONCLUSION

Various embodiments of methods for supporting communications between multiple nodes operating in a master-slave configuration have been described. The various embodiments have numerous advantages over prior art methods and apparatus. For example, the methods of the various embodiments enable multiple application instances within a single node to be managed using a master-slave configuration, rather than managing only a single application instance, as was possible with the prior art. In addition, the various embodiments can continually listen for and begin managing new application instances within the node or in other nodes. The methods and apparatus of the various embodiments also are easily scalable from 2 to N nodes, without changing the design or implementation of the protocol.

Besides providing an automatic and scalable means of updating and synchronizing existing configurations, the method and apparatus of one embodiment of the present invention also can automatically propagate (and instantiate) new application instances to a node (or any number of nodes) that joins a cluster and that did not previously manage that application instance. This means that a user can introduce a new node into a given cluster, and all applications (and their configurations) will automatically migrate to and be created on that node. At that point, the new node will be able to take part in any failover operations in the defined cluster.

Besides these advantages, each node efficiently maintains accurate configuration information by exchanging formatted configuration data over data retrieval connection between the local and a remote node. The methods and apparatus of the present invention provide numerous other advantages over the prior art, as well.

In the foregoing detailed description of the preferred embodiments, reference is made to the accompanying drawings, which form a part hereof, and in which are shown by way of illustration specific preferred embodiments in which the invention may be practiced. These embodiments are described in sufficient detail to enable those skilled in the art to practice the invention. It will be appreciated by those of ordinary skill in the art that any arrangement, which is calculated to achieve the same purpose, may be substituted for the specific embodiments shown.

This application is intended to cover various adaptations or variations of the present invention. The foregoing detailed description is, therefore, not to be taken in a limiting sense, and it will be readily understood by those skilled in the art that various other changes in the details, materials, and arrangements of the parts and steps, which have been described and illustrated in order to explain the nature of this invention, may be made without departing from the scope of the invention as expressed in the adjoining claims. Therefore, all such changes are intended to fall within the scope of the present invention.

What is claimed is:

1. A method for maintaining configuration information at a first node, wherein the first node is connected by one or more networks to one or more other nodes which operate in a master-slave configuration, the method comprising:
   determining with a multiple instance heartbeat message including multiple configuration identifier fields whether configuration information for an application instance being managed by the first node is current, wherein the application instance is operating on the first node in at least one of a master and a slave configuration;
   if the configuration information at the first node is not current, establishing a Hyper-Text Transfer Protocol (HTTP) connection with a remote node of the one or more other nodes from which updated configuration information can be obtained;
   requesting the updated configuration information from the remote node; and
   receiving the updated configuration information, the updated configuration information including a configuration identifier and providing data for operation of the application instance.

2. The method as claimed in claim 1, wherein determining whether the configuration information is current comprises:
   receiving the multiple instance heartbeat message, which includes a configuration identifier field associated with the application instance;
   comparing a first configuration identifier within the configuration identifier field with a stored configuration identifier that identifies current configuration information being used by the first node for the application instance; and
   if the first configuration identifier identifies a different version of configuration information than the stored configuration identifier, determining that the configuration information is not current.

3. The method as claimed in claim 1, wherein determining whether the configuration information is current comprises:
   receiving the multiple instance heartbeat message, wherein each of the multiple configuration identifier fields is associated with one of multiple application instances being managed by the first node in the master-slave configuration;
   comparing a first configuration identifier within one of the multiple configuration identifier fields with a stored configuration identifier that identifies current configuration information being used by the first node for the application instance; and
   if the first configuration identifier identifies a different version of configuration information than the stored configuration identifier, determining that the configuration information is not current.

4. The method as claimed in claim 1, wherein establishing the HTTP connection comprises establishing an HTTP over Secure Sockets Layer (SSL) connection.

5. The method as claimed in claim 1, wherein establishing the HTTP connection comprises establishing an HTTP over Transport Layer Security (TLS) connection.

6. The method as claimed in claim 1, wherein receiving the updated configuration information comprises receiving the updated configuration information in a self-describing structured text format.

7. The method as claimed in claim 6, wherein receiving the updated configuration information comprises receiving the updated configuration information in an Extensible Markup Language (XML) format.

8. The method as claimed in claim 2, further comprising:
   storing the updated configuration information; and
   changing the stored configuration identifier for the application instance to the first configuration identifier.

9. A node within a computer system which operates in a master-slave configuration, the node comprising:
   at least one processor that determines with a multiple instance heartbeat message including multiple configuration identifier fields whether configuration information for an application instance being managed by the node is current, and if not, establishes a Hyper-Text Transfer Protocol (HTTP) connection with a remote node from which updated configuration information can be obtained, requests the updated configuration information from the remote node, and receives the updated configuration information, the updated configuration information including a configuration identifier and providing data for operation of the application instance; and
   at least one interface to at least one external network, which supports establishment of the connection with the remote node.

10. The node as claimed in claim 9, wherein the at least one processor establishes the HTTP connection by establishing an HTTP over Secure Sockets Layer (SSL) connection.

11. The node as claimed in claim 9, wherein the at least one processor establishes the HTTP connection by establishing an HTTP over Transport Layer Security (TLS) connection.

12. The node as claimed in claim 9, wherein the at least one processor receives the updated configuration information by receiving the updated configuration information in a self-describing structured text format.

13. The node as claimed in claim 12, wherein the at least one processor receives the updated configuration information by receiving the updated configuration information in an Extensible Markup Language (XML) format.

14. A computer readable medium having computer executable instructions stored thereon to maintain configuration information by a first node, wherein the first node is connected by one or more networks to one or more other nodes which operate in a master-slave configuration, the instructions which, when executed by a computer, cause the computer to:
   determine with a multiple instance heartbeat message including multiple configuration identifier fields whether configuration information for an application instance being managed by the node is current, wherein the application instance is operating on the first node in at least one of a master and a slave configuration;
   if not, establish a Hyper-Text Transfer Protocol (HTTP) connection with a remote node from which updated configuration information can be obtained;
   request the updated configuration information from the remote node; and receive the updated configuration information, the updated configuration information including a configuration identifier and providing data for operation of the application instance.

15. The computer readable medium as claimed in claim 14, wherein establishing the HTTP connection comprises establishing an HTTP over Secure Sockets Layer (SSL) connection.

16. The computer readable medium as claimed in claim 14, wherein establishing the HTTP connection comprises establishing an HTTP over Transport Layer Security (TLS) connection.

17. The computer readable medium as claimed in claim 14, wherein receiving the updated configuration information comprises receiving the updated configuration information in a self-describing structured text format.

18. The computer readable medium as claimed in claim 17, wherein receiving the updated configuration information comprises receiving the updated configuration information in an Extensible Markup Language (XML) format.

19. A node within a computer system which operates in a master-slave configuration, the node comprising:

means for processing, which determines with a multiple instance heartbeat message including multiple configuration identifier fields whether configuration information for an application instance being managed by the node is current, and if not, establishes a Hyper-Text Transfer Protocol (HTTP) connection with a remote node from which updated configuration information can be obtained, requests the updated configuration information from the remote node, and receives the updated configuration information, the updated configuration information including a configuration identifier and providing data for operation of the application instance; and means for interfacing with at least one external network, which supports establishment of the connection with the remote node.

20. The node as claimed in claim 19, wherein the means for processing establishes the HTTP connection by establishing an HTTP over Secure Sockets Layer (SSL) connection.

21. The node as claimed in claim 19, wherein the means for processing establishes the HTTP connection by establishing an HTTP over Transport Layer Security (TLS) connection.

22. The node as claimed in claim 19, wherein the means for processing receives the updated configuration information by receiving the updated configuration information in a self-describing structured text format.

23. The node as claimed in claim 22, wherein the means for processing receives the updated configuration information by receiving the updated configuration information in an Extensible Markup Language (XML) format.

* * * * *

UNITED STATES PATENT AND TRADEMARK OFFICE
CERTIFICATE OF CORRECTION

| | | |
|---|---|---|
| PATENT NO. | : 7,353,259 B1 | Page 1 of 1 |
| APPLICATION NO. | : 10/128657 | |
| DATED | : April 1, 2008 | |
| INVENTOR(S) | : Bakke et al. | |

It is certified that error appears in the above-identified patent and that said Letters Patent is hereby corrected as shown below:

On the title page, item (74), in "Attorney, Agent, or Firm", in column 2, line 2, delete "Woessne" and insert -- Woessener --, therefor.

In column 1, line 40, delete "imperceivable" and insert -- unperceivable --, therefor.

Signed and Sealed this

Eighth Day of July, 2008

JON W. DUDAS
*Director of the United States Patent and Trademark Office*